United States Patent [19]

Nishikawa et al.

[11] Patent Number: 5,080,489
[45] Date of Patent: Jan. 14, 1992

[54] FIBER OPTIC GYROSCOPE FOR DETECTING ANGULAR VELOCITY OF ROTATION USING EQUIVALENT TIME SAMPLING

[75] Inventors: Kozo Nishikawa, Amagasaki; Shuji Sonoda, Kawasaki; Hirohisa Nakata, Amagasaki, all of Japan

[73] Assignee: Kubota, Ltd., Osaka, Japan

[21] Appl. No.: 500,013

[22] Filed: Mar. 27, 1990

[30] Foreign Application Priority Data

Mar. 29, 1989 [JP] Japan ................... 1-79107
Aug. 2, 1989 [JP] Japan ................... 1-200785
Sep. 21, 1989 [JP] Japan ................... 1-247358

[51] Int. Cl.$^5$ .............................................. G01C 19/72
[52] U.S. Cl. .................................................. 356/350
[58] Field of Search .............................. 356/345, 350

[56] References Cited

U.S. PATENT DOCUMENTS 4,637,722  1/1987  Kim ........................... 356/350

FOREIGN PATENT DOCUMENTS 2-189412  7/1990  Japan .

OTHER PUBLICATIONS

"Fiber Optic Laser Gyro Signal Detection and Processing Technique", Martin et al., SPIE vol. 139, 1978, pp. 98–102.

Direct/Rotation-Rate Detector with a Fibre-Optic Gyro by Using Digital Data Processing, Nov. 10, 1983, vol. 19, No. 23.

Primary Examiner—Samuel Turner
Attorney, Agent, or Firm—Webb, Burden, Ziesenheim & Webb

[57] ABSTRACT

A phase-modulated fiber optic gyroscope comprises a signal generating a signal generating section, a photoelectric converter section and a signal processing section. The signal generating section includes a light source, an optical path for propagating light from the light source clockwise and counterclockwise, and a phase modulator for modulating the light propagating through the optical path. The photoelectric converter section converts an optical signal received from the signal generating section into an electric signal. The signal processing section derives a direction of rotation and a velocity of rotation from the electric signal received from the photoelectric converter section. The signal processing section includes an analog-to-digital converter for converting the electric signal received from the photoelectric converter section into a digital signal, and a digital signal processor for carrying out angle calculations based on the digital signal received from the analog-to-digital converter.

6 Claims, 12 Drawing Sheets

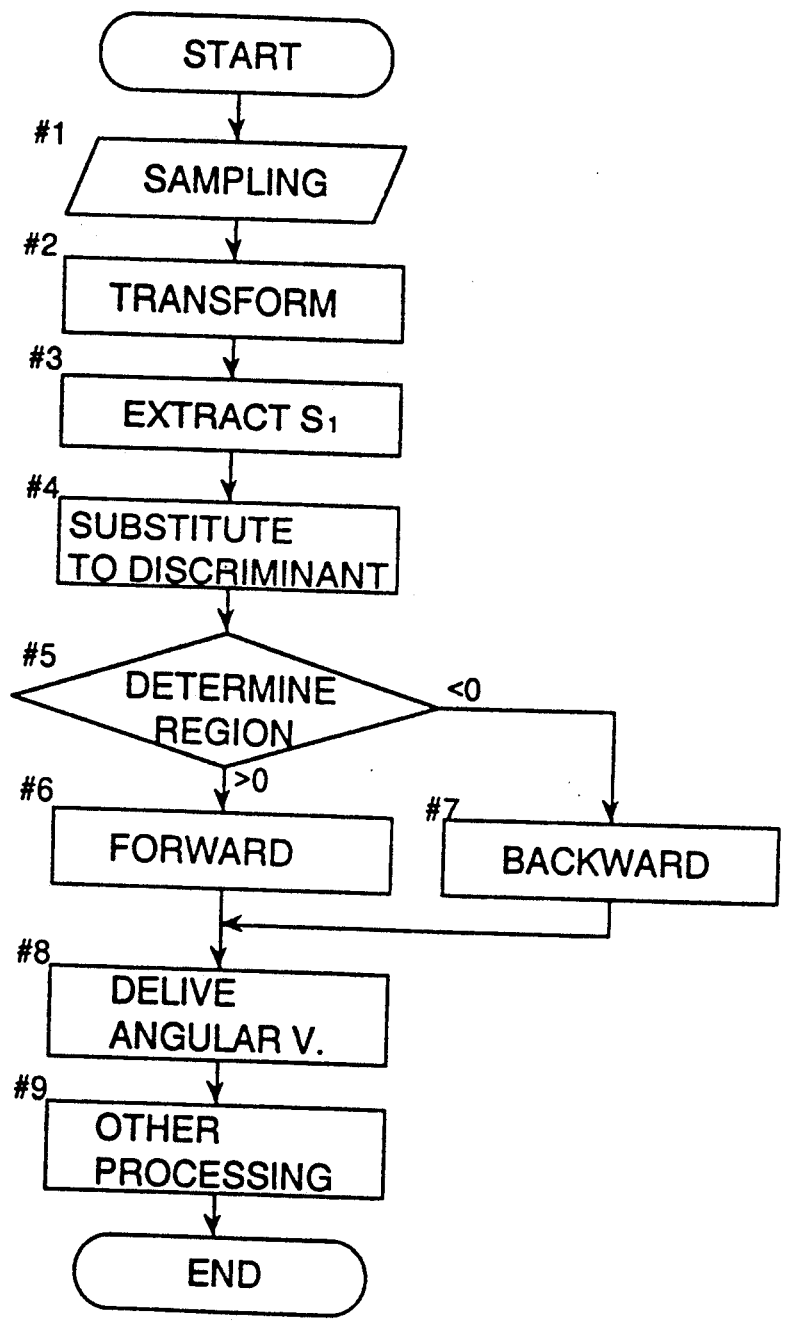

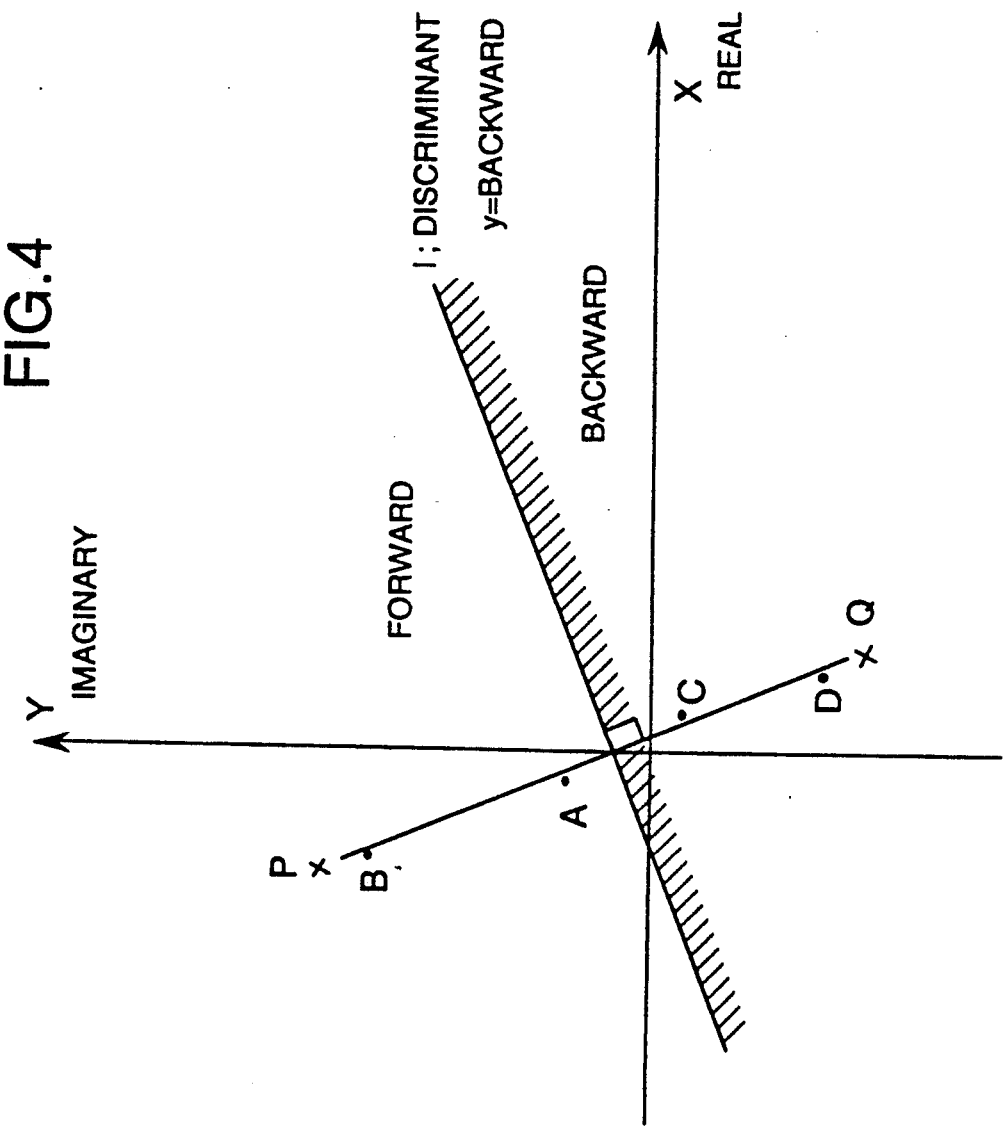

$(\Delta\theta=135°, \Omega=270°/S)$ $(\Delta\theta=180°, \Omega=360°/S)$ $(\Delta\theta=45°, \Omega=-90°/S)$ ($\Delta\theta = 135°$, $\Omega = 270°/S$)

$\sqrt{2}E_1E_2(J_1\cos\omega mt - J_2\cos 2\omega mt + J_3\cos 3\omega mt - J_4\cos 4\omega mt)$ ($\Delta\theta = 180°$, $\Omega = 360°/S$)

$-2E_1E_2(J_2\cos 2\omega mt + J_4\cos 4\omega mt)$ ($\Delta\theta = 45°$, $\Omega = -90°/S$)

$-\sqrt{2}E_1E_2(J_1\cos\omega mt - J_2\cos 2\omega mt + J_3\cos 3\omega mt + J_4\cos 4\omega mt)$

FIG.6

| $\Delta\theta$ | $\Omega$ | $P_0$ 0 | $P_1$ $\pi/2$ | $P_2$ $\pi$ | $P_3$ $2\pi/2$ | $P_4$ $2\pi$ | $P_0$a AMPLITUDE |
|---|---|---|---|---|---|---|---|
| 0° | 0°/S | + | − | + | − | + | $2E_1E_2(J_2+J_4)$ |
| ? | ? | ↗ |  | ↘ |  | ↗ | ↗ |
| 45 | 90 | MAX. | − | $0_1$ | − | MAX. | $\sqrt{2}E_1E_2(J_1+J_2+J_3+J_4)$ |
| ? | ? | ↘ |  | ↘ |  | ↘ | ↘ |
| 90 | 180 | + | 0 | − | 0 | + | $2E_1E_2(J_1+J_3)$ |
| ? | ? | ↘ |  | ↘ |  | ↘ | ↘ |
| 135 | 270 | $0_1$ | + | MIN. | + | $0_1$ | $\sqrt{2}E_1E_2(J_1-J_2+J_3-J_4)$ |
| ? | ? | ↘ |  | ↗ |  | ↘ | ↘ |
| 180 | 360 | − | + | − | + | − | $-2E_1E_2(J_2+J_4)$ |
| 0 | 0 | + | − | + | − | + | $2E_1E_2(J_2+J_4)$ |
| ? | ? | ↘ |  | ↗ |  | ↘ | ↘ |
| −45 | −90 | $0_2$ | − | MAX. | − | $0_2$ | $-\sqrt{2}E_1E_2(J_1-J_2+J_3-J_4)$ |
| ? | ? | ↘ |  | ↘ |  | ↘ | ↘ |
| −90 | −180 | − | 0 | + | 0 | − | $-2E_1E_2(J_1+J_3)$ |
| ? | ? | ↘ |  | ↘ |  | ↘ | ↘ |
| −135 | −270 | MIN. | + | $0_2$ | + | MIN. | $-\sqrt{2}E_1E_2(J_1+J_2+J_3+J_4)$ |
| ? | ? | ↗ |  | ↘ |  | ↗ | ↗ |
| −180 | −360 | − | + | − | + | − | $-2E_1E_2(J_2+J_4)$ |

$0_1 = \sqrt{2}E_1E_2(J_1-J_2+J_3-J_4)$
$0_2 = \sqrt{2}E_1E_2(J_1-J_2+J_3-J_4)$

↗ INDICATES INCREASE
↘ INDICATES DECREASE

FIG.7

| VELOCITY RANGE (°/sec) | AMPLITUDE AT $P_0$ $A_0$ | POLARITY AT $P_2$ | OPERATION EXP. ($\Omega =$) | DIRECTION |
|---|---|---|---|---|
| $0 \leq \Omega < 90$ | $2E_1E_2(J_2+J_4) \leq A_0$ | $> 0$ | $\dfrac{1}{a} \tan^{-1} \dfrac{J_2}{J_1} \cdot \dfrac{S_1}{S_2}$ | F O R W A R D (CW) |
| $90 \leq \Omega < 180$ | $\sqrt{2}E_1E_2(J_1+J_2+J_3+J_4) < A_0 < 2E_1E_2(J_1+J_3)$ | $< 0$ | $\dfrac{1}{a} \cot^{-1} \dfrac{J_1}{J_2} \cdot \dfrac{S_2}{S_1}$ | |
| $180 \leq \Omega < 270$ | $\sqrt{2}E_1E_2(J_1-J_2+J_3-J_4) < A_0 < 2E_1E_2(J_1+J_3)$ | $< 0$ | $\dfrac{1}{a} \cot^{-1} \dfrac{J_1}{J_2} \cdot \dfrac{S_2}{S_1}$ | |
| $270 \leq \Omega < 360$ | $-2E_1E_2(J_2+J_4) < A_0 \leq \sqrt{2}E_1E_2(J_1-J_2+J_3-J_4)$ | $< 0$ | $\dfrac{1}{a} \tan^{-1} \dfrac{J_2}{J_1} \cdot \dfrac{S_1}{S_2}$ | |
| $-90 \leq \Omega < 0$ | $-2E_1E_2(J_1-J_2+J_3-J_4) \leq A_0 < 2E_1E_2(J_2+J_4)$ | $> 0$ | $\dfrac{1}{a} \tan^{-1} \dfrac{J_2}{J_1} \cdot \dfrac{S_1}{S_2}$ | B A C K W A R D (CCW) |
| $-180 \leq \Omega < -90$ | $-2E_1E_2(J_1+J_2) \leq A_0 < \sqrt{2}E_1E_2(J_1-J_2+J_3-J_4)$ | $> 0$ | $\dfrac{1}{a} \cot^{-1} \dfrac{J_1}{J_2} \cdot \dfrac{S_2}{S_1}$ | |
| $-270 \leq \Omega < -180$ | $-\sqrt{2}E_1E_2(J_1+J_2+J_3+J_4) \leq A_0 < -2E_1E_2(J_1+J_2)$ | $> 0$ | $\dfrac{1}{a} \cot^{-1} \dfrac{J_1}{J_2} \cdot \dfrac{S_2}{S_1}$ | |
| $-360 < \Omega < -270$ | $-\sqrt{2}E_1E_2(J_1+J_2+J_3+J_4) < A_0 < -2E_1E_2(J_1+J_4)$ | $< 0$ | $\dfrac{1}{a} \tan^{-1} \dfrac{J_2}{J_1} \cdot \dfrac{S_1}{S_2}$ | | a = SCALE FACTOR

FIBER OPTIC GYROSCOPE FOR DETECTING ANGULAR VELOCITY OF ROTATION USING EQUIVALENT TIME SAMPLING

TECHNICAL FIELD

The present invention relates to fiber optic gyroscopes mounted on moving vehicles or the like for detecting angular velocity of rotation. More particularly, the invention relates to a phase-modulated fiber optic gyroscope comprising a signal generating section including a light source, an optical path for propagating light from the light source clockwise and counterclockwise, and a phase modulator for modulating the light propagated through the optical path, and a signal processing section for deriving a direction of rotation and an angular velocity of rotation from an output signal of the signal generating section.

BACKGROUND OF THE INVENTION

This type of phase-modulated fiber optic gyroscope derives the angular velocity of rotation on the following principle:

When a rotation at an angular velocity is applied in the optical path, a phase difference 0 due to Sagnac effect occurs with the light propagating clockwise and counterclockwise through the optical path. At this time, the following equation is formed between angular velocity $\Omega$ and phase difference $\Delta\theta$:

$$\Delta\theta = (8\pi NA/\lambda c)\Omega \quad (1)$$

where A is an area surrounding the optical path, C is a light velocity within a vacuum, $\lambda$ is a waveform within a vacuum, and N is the number of turns.

If the phase modulator provides a modulated voltage f(t) expressed by the following equation:

$$f(t) = b \sin \omega_m t \quad (2)$$

where b is a modulation amplitude, and $\omega_m$ is a modulation angular frequency, then a phase difference $\phi$ in phase modulation occurs between clockwise light and counterclockwise light passing through the optical path.

$$\phi = \omega_m \tau = nl\omega_m/c = 2\pi f_m n l/c \quad (3)$$

where $\tau$ is a passage time of light, l is a fiber length, n is a refractive index, and fm is a modulation frequency.

If a light output of the signal generating section is converted into an electric signal by a photoelectric converter, then;

$$\begin{aligned}
S(\Delta\theta,t) &= |E1\sin\{\omega t + \Delta\theta/2 + b\sin(\omega_m t + \phi/2)\} + \\
&\quad E2\sin\{\omega t - \Delta\theta/2 + b\sin(\omega_m t - \phi/2)\}|^2 \\
&= \tfrac{1}{2}(E1^2 + E2^2) + E1E2J0(2b\sin(\phi/2))\cos\Delta\theta + \\
&\quad (DC\ level\ signal) \\
&\quad 2E1E2J1(2b\sin(\phi/2))\sin\Delta\theta\cos\omega_m t + \\
&\quad (basic\ frequency\ component\ S1) \\
&\quad 2E1E2J2(2b\sin(\phi/2))\cos\Delta\theta\cos2\omega_m t + \\
&\quad (second\ higher\ harmonic\ component\ S2) \\
&\quad 2E1E2J3(2b\sin(\phi/2))\sin\Delta\theta\cos3\omega_m t + \\
&\quad (third\ higher\ harmonic\ component\ S3) \\
&\quad 2E1E2J4(2b\sin(\phi/2))\cos\Delta\theta\cos4\omega_m t + \ldots \\
&\quad (fourth\ higher\ harmonic\ component\ S4)
\end{aligned} \quad (4)$$

where Jn (n=0, 1, 2 ...) is Bessel function.

In equation (4), $\Delta\theta$ is obtained by extracting basic frequency component S1 and second higher harmonic component S2.

$$\Delta\theta = \tan^{-1}[J2(\xi)/J1(\xi) \cdot S1/S2] \quad (5)$$

$$\xi = 2b \sin (\phi/2)$$

According to equation (5), the value of $\Delta\theta$ is indefinite but may be determined by checking the signs of S1 and S2.

The constant term $J2(\xi)/J1(\xi)$ is maintained constant by controlling $\xi = 2b\sin(\phi/2)$ to render constant the ratio between the second higher harmonic component S2 and fourth higher harmonic component S4;

$$S2/S4 = J2(\xi)/J4(\xi) \quad (6)$$

More particularly, the basic modulation frequency component and a plurality of higher modulation harmonic components are extracted from the output signal of the signal generating section. By controlling the drive voltage for the phase modulator to put the amplitude ratios among the plurality of components to a predetermined value, compensation is made for variations in scale factor due to variations and the like in polarization inside the optical fiber resulting from environmental variations such as in temperature and pressure.

In the conventional analog system, the signal processing section includes a plurality of synchronized wave detecting circuits (also called lock-in amplifiers) corresponding to the respective frequency components and arranged downstream of the photoelectric converter in order to extract the basic modulation frequency component and the plurality of higher modulation frequency components. Based on outputs of the synchronized wave detecting circuits, the angular velocity is calculated and the drive voltage is controlled for the phase modulator.

According to the above circuit construction, however, stability of the synchronized wave detecting circuits has great influences on the precision of angular velocity in compensating for variations in the scale factor.

That is, with the synchronized wave detecting circuits, compensating precision may deteriorate as a result of variations or time-dependent changes due to temperature characteristics of the output voltage since analog signals are involved. Consequently, the direction of rotation as derived and the angular velocity calculated lack in reliability.

Further, a step of adjusting gains and the like must be taken initially for the plurality of synchronized wave detecting circuits. Adjusting errors occurring then greatly affects the compensating precision.

SUMMARY OF THE INVENTION

An object of the present invention is to provide a fiber optic gyroscope with reduced measurement errors due to temperature variations and the like and with reduced costs of adjustment and assembly.

The above object is fulfilled, according to the present invention, by a phase-modulated fiber optic gyroscope comprising a signal generating section including a light source, an optical path for propagating light from the light source clockwise and counterclockwise, and a phase modulator for modulating the light propagating through the optical path; a photoelectric converting section for converting an optical signal received from the signal generating section into an electric signal; and a signal processing section for deriving a direction of rotation and a velocity of rotation from the electric signal received from the photoelectric converting section means, the signal processing section including an analog-to-digital converter for converting the electric signal received from the photoelectric converting section directly into a digital signal, and a digital signal processor for carrying out angle calculations based on the digital signal received from the analog-to-digital converter.

According to the above construction, the output signal of the photoelectric converting section is converted directly into a digital signal by the analog-to-digital converter in the signal processing section. Then the digital signal is broken up by the digital signal processor into a basic modulation frequency component and a plurality of higher modulation frequency components. Thereafter, predetermined arithmetic operations are carried out to derive an angular velocity and to control a drive frequency of the phase modulator. Such a signal processing section does not require a synchronized wave detecting circuit as an analog signal processor.

With the phase-modulated fiber optic gyroscope according to the present invention, the analog-to-digital converter directly converts the output signal of the photoelectric converting section into a digital signal for input to the digital signal processor. The signal processing section, therefore, does not require a synchronized wave detecting circuit which involves a deterioration in precision due to output voltage variations resulting from temperature characteristics and time-dependent changes and necessitates various adjusting operations. This fiber optic gyroscope achieves low costs of parts and assembly, and secures a desired steady performance over a long period of time.

In a preferred embodiment of the invention, the digital signal processing section includes a processor for effecting high-speed Fourier transformation of the signal input thereto, and a memory for storing positive/negative discriminating reference data corresponding to real and imaginary number portions of a Fourier transformation value, whereby the positive/negative of the rear number portion of the Fourier transformation value is determined through comparison between the Fourier transformation value received from the processor and the positive/negative discriminating reference data.

According to this construction, after the output signal of the signal generating section is directly converted into a digital signal, this digital signal is subjected to Fourier transformation at the processor. Results of operation for selected frequency components are extracted.

The results of operation are compared with positive/negative discriminating reference data stored in the memory and corresponding to real and imaginary numbers, thereby to determine the positive/negative of the rear number in the results of operation.

Where, for example, the signal generating section comprises a phase-modulated fiber optic gyroscope, the positive/negative discriminating reference data is determined as follows. The fiber optic gyroscope is set to a turntable as a reference system, and the turntable is spun at an equal angular velocity clockwise and counterclockwise. Data are sampled during the spins. These data are subjected to high-speed Fourier transformation, to extract results of operation for basic modulation frequency S1. Next, an equation representing a vertical bisector between the two points in a complex space is obtained and stored in the memory as the positive/negative discriminating reference data.

Thereafter, the data placed and sampled in an actual measurement system is put to the high-speed Fourier transformation, and checking is made which side of the vertical bisector lies the region to which the result of operation for the basic modulation frequency S1 belongs. In this way, discrimination is made as to positive/negative of the real number in the results of operation in the actual measurement system.

According to the digital signal processing device according to the present invention, discrimination is made as to positive/negative of the real number in the results of operation very accurately by reducing the influences of various characteristics of the signal generating section, electric noise, and errors occurring in the processor.

With this phase-modulated fiber optic gyroscope, the direction of rotation may be detected with a very high accuracy even when a subtle angular velocity of rotation in the order of 0.1° to 0.01°/S is applied.

In a further preferred embodiment of the invention, the digital signal processing section is operable to determine a direction of rotation by comparing waveform information included in the input digital signal and based on components of a synchronizing signal synchronized with a modulation signal of the phase modulator, with basic waveform information stored in advance.

In this case, a signal is output from a synchronizing signal generator as synchronized with the modulation signal of the phase modulator. Thus, the data sampled by the analog-to-digital converter from the output signal of the signal generating section may be treated as waveform data for one cycle of modulation frequency based on the synchronizing signal and as data having no phase shift although an angular velocity applied is varied.

On the other hand, the memory stores basic waveform data representing waveform characteristics variable with the direction of rotation.

The signal processing section compares the basic waveform data and sampled data to determine the direction of rotation.

That is, the output signal of the signal generating section is variable with the angular velocity $\Omega$ applied, as shown in equation [4]. The conditions of variation have patterns peculiar to the clockwise and counterclockwise directions of rotation.

Based on this fact, the direction of rotation is determined by checking with which direction of rotation, clockwise or counterclockwise, is associated the pattern of the waveform data sampled by the analog-to-digital converter.

In this way, the direction of rotation of the fiber optic gyroscope may be determined with great facility and within a short time without spending an extended operating time necessitated by Fourier transformation.

The foregoing and other objects, features and advantages of the invention will be apparent from the following more particular description of preferred embodiments of the invention, as illustrated in the accompanying drawings.

BRIEF DESCRIPTION OF THE DRAWINGS

The drawings show a phase-modulated fiber optic gyroscope according to the present invention, in which:

FIG. 3 is a flowchart of digital signal processing, FIG. 4 is a graph of a reference discriminant, FIGS. 6 and 7 are tables of amplitude values and polarities of signal waveforms.

DETAILED DESCRIPTION OF THE PREFERRED EMBODIMENTS

Figure 1:
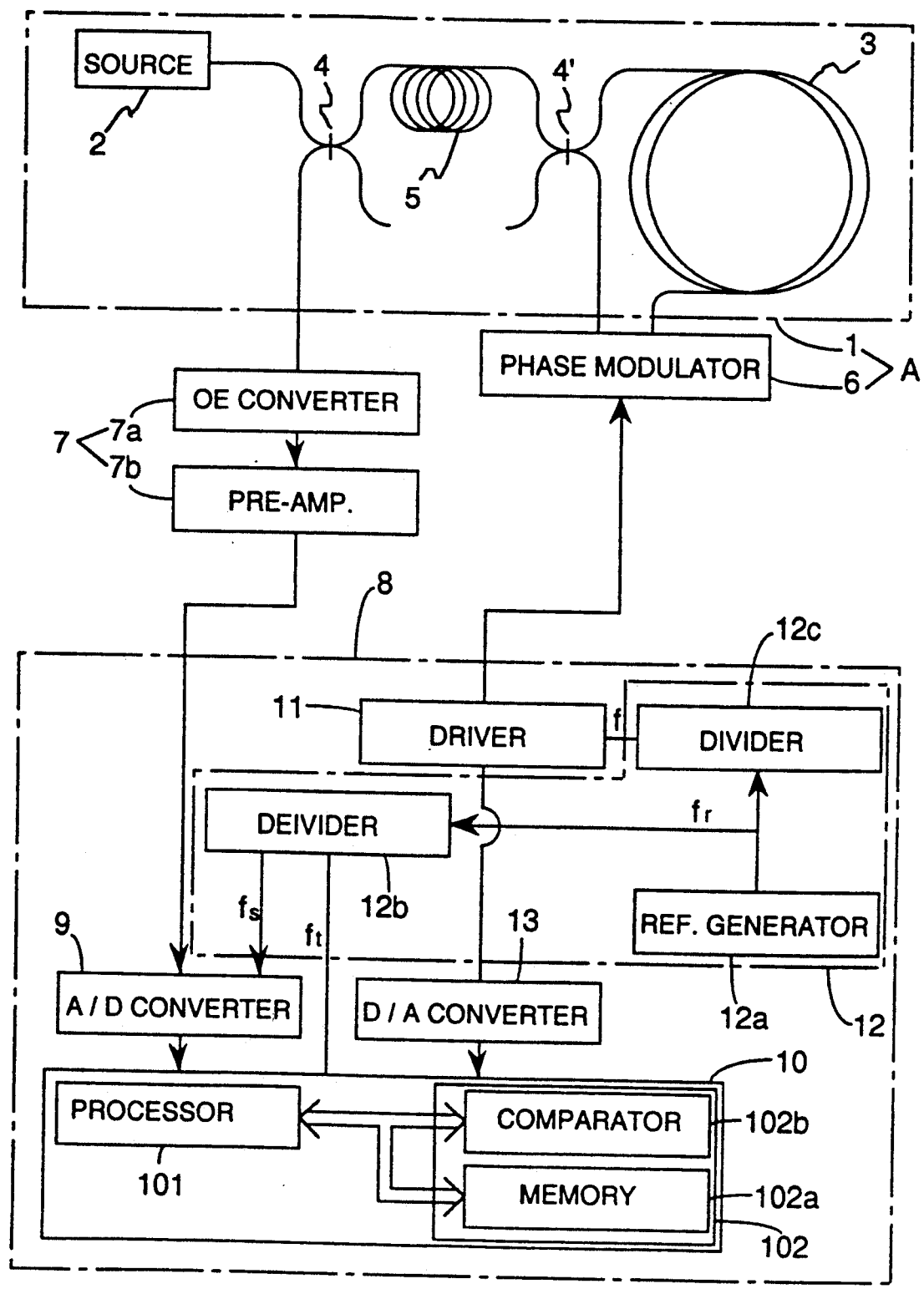
FIG. 1 is a block diagram of the fiber optic gyroscope.

As shown in FIG. 1, a phase-modulated fiber optic gyroscope acting comprises a signal generating section A including an optical system 1 and a phase modulator 6. The optical system 1 includes a light source 2 and an optical path 3 for propagating light from the light source 2, such as a laser diode, clockwise and counterclockwise. The phase modulator 6 is disposed at an end of the optical path 3 and operable with a predetermined frequency. An output signal of the signal generating section A is input through a photoelectric conversion section 7 to a signal processing section 8 for calculating angular velocity and the like.

The optical path 3 comprises an optical fiber loop formed by coiling a Single-Polarization Fiber-Optic (S.P.F.). Light is led from the light source through polarized wave retaining photocouplers 4 and 4' and a polarizing filter 5. Thus, the light source 2, S.P.F. Directional Coupler 4 and 4', polarizing filter 5 and optical path 3 constitute the optical system 1.

The phase modulator 6 is formed by winding the optical fiber forming the optical path 3 around an electrostrictive element such as a PZT at an end of the optical path 3. The electrostrictive element is driven with a predetermined frequency by a signal from a driver 11, which will be described later, to extend and contract the optical fiber thereby to modulate the phase of the light propagating through the optical path 3. Thus, the optical system 1 and phase modulator 6 constitute the signal generating section A.

The photoelectric conversion section 7 includes a photoelectric converter 7a and a pre-amplifier 7b. The photoelectric converter 7a converts an optical signal propagating through the optical path 3 clockwise and counterclockwise and output from the photocoupler 4 into an electric signal. The pre-amplifier 7b amplifies the slight electric signal output from the photoelectric converter 7a to an appropriate level.

The signal processing section 8 includes an analog-to-digital conversion unit 9, a digital signal processing unit 10, the driver 11 for driving the phase modulator 6, a timing signal generating unit 12 and a digital-to-analog conversion unit 13. The analog-to-digital conversion unit 9 converts an output signal of the pre-amplifier 7b into a digital signal. The digital signal processing unit 10 calculates angular velocity based on an output signal received from the analog-to-digital conversion unit 9, and provides a feedback control for the phase modulator 6. The timing signal generating unit 12 applies predetermined signals to the analog-to-digital conversion unit 9 and driver 11. The digital-to-analog conversion unit 13 transmits feedback data from the digital signal processing unit 10 to the driver 11.

The analog-to-digital conversion unit 9 includes a sample hold circuit and an analog-to-digital convertor. The sample hold circuit. The timing signal generating unit 12 includes a reference signal generator 12a, a frequency divider 12b and a further frequency divider 12c. The sample hold circuit of the conversion unit 9 takes in the analog signal output from the pre-amplifier 7b in synchronism with a sampling pulse signal having a frequency fs divided by the frequency divider 12b from a reference signal having a frequency fr output from the timing signal generator 12a. The analog-to digital converter of the conversion unit 9 converts the analog signal held by the sample hold circuit into a digital signal. The frequency divider 12c outputs a clock signal to the driver 11.

Further, the frequency divider 12b outputs a trigger signal having a frequency ft in synchronism with the frequencies f and fs. This trigger signal is input to the digital signal processing unit 10.

Thus, the timing signal generating unit 12 acts as a synchronous signal generating unit 12 for outputting signals in synchronism with a modulation signal of the phase modulator 6.

The analog-to-digital conversion unit 9 takes in a basic modulation frequency component (frequency fm), a second higher harmonic component (frequency 2 fm) and a fourth higher harmonic component (4 fm) of the output signal provided by the optical system 1.

Figure 2:
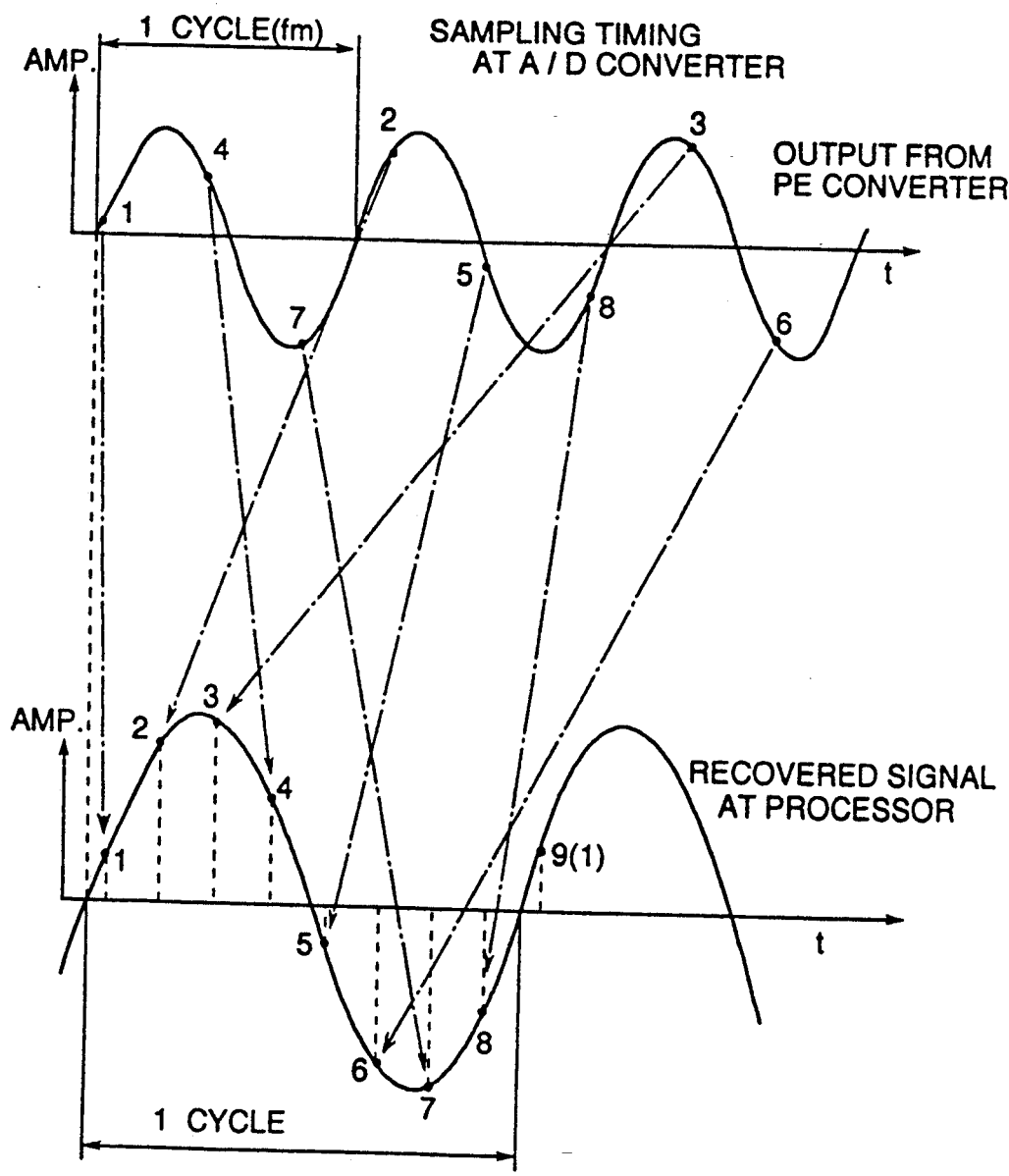
FIG. 2 is a time chart showing sampling timing of an analog-to-digital converter.
Figure 5A:
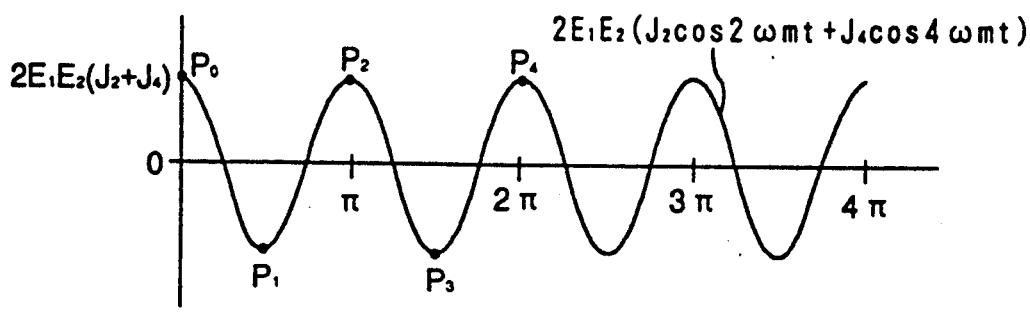
FIGS. 5A through 5I are views showing waveforms of outputs from a signal generating section.
Figure 5B:
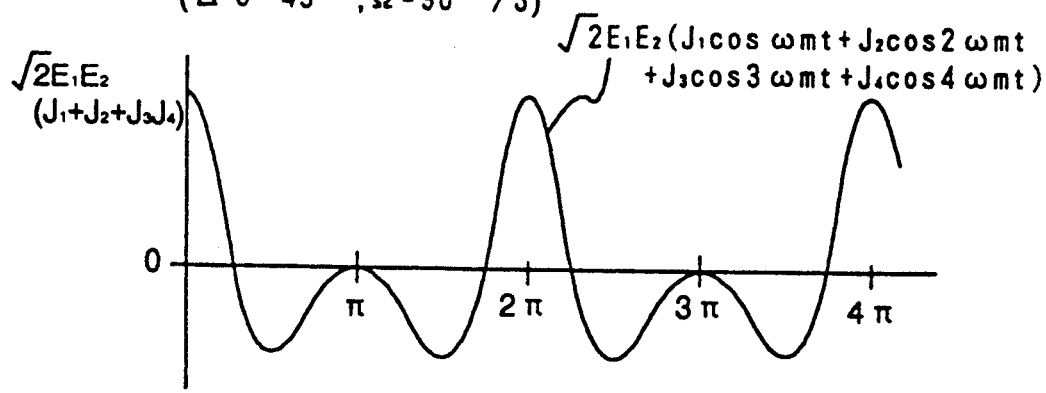
Figure 5C:
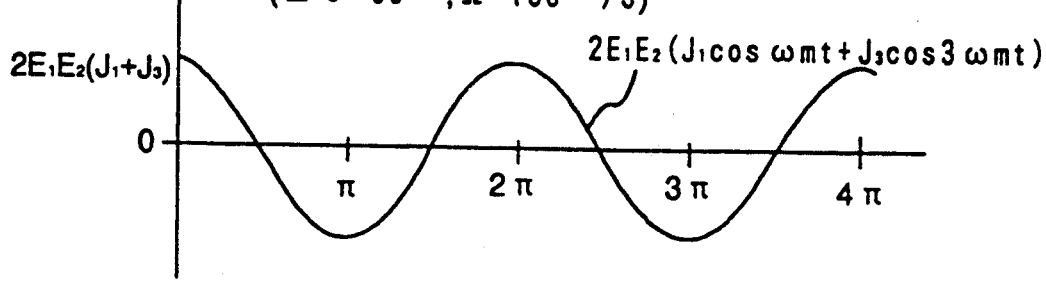
Figure 5D:
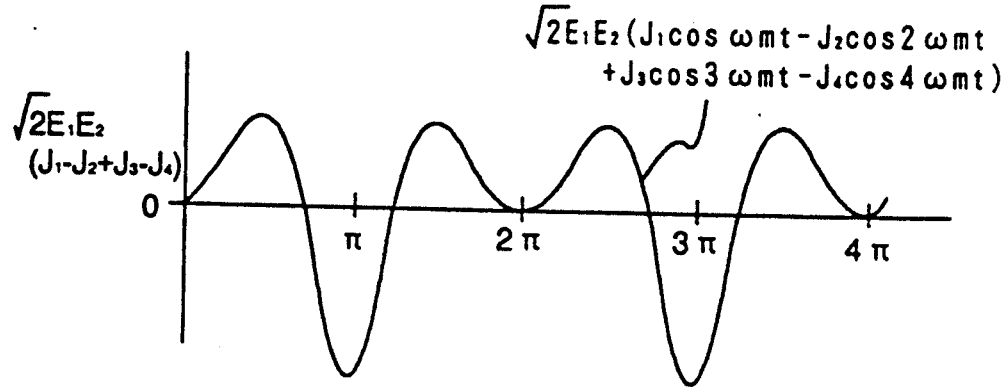
Figure 5E:
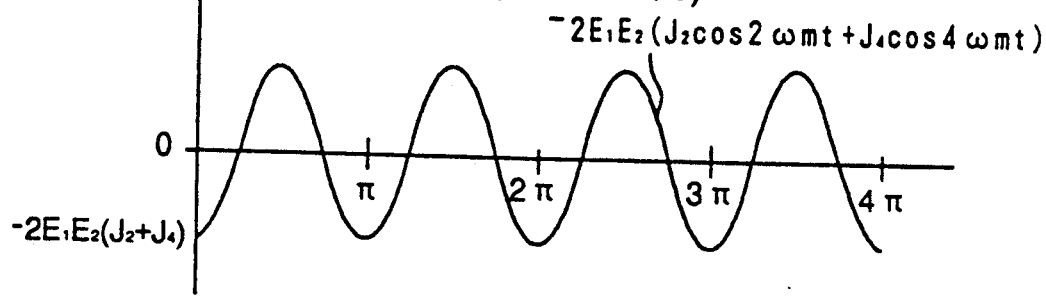
Figure 5F:
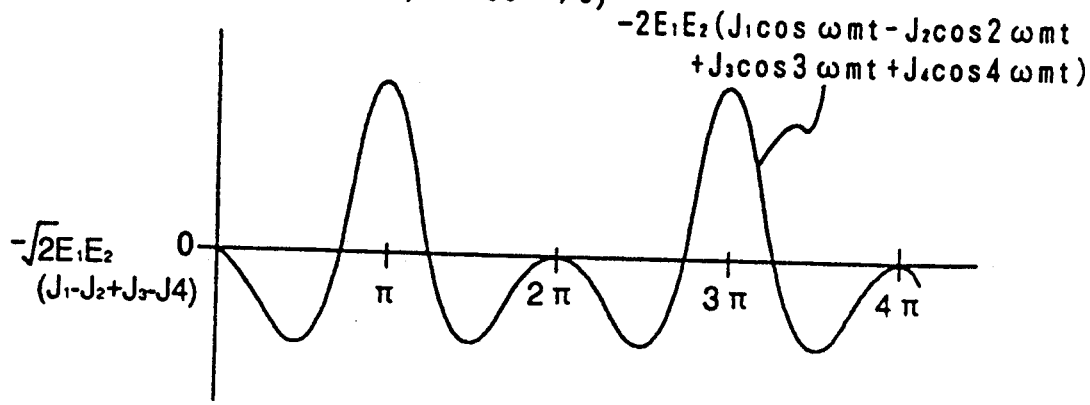
Figure 5G:
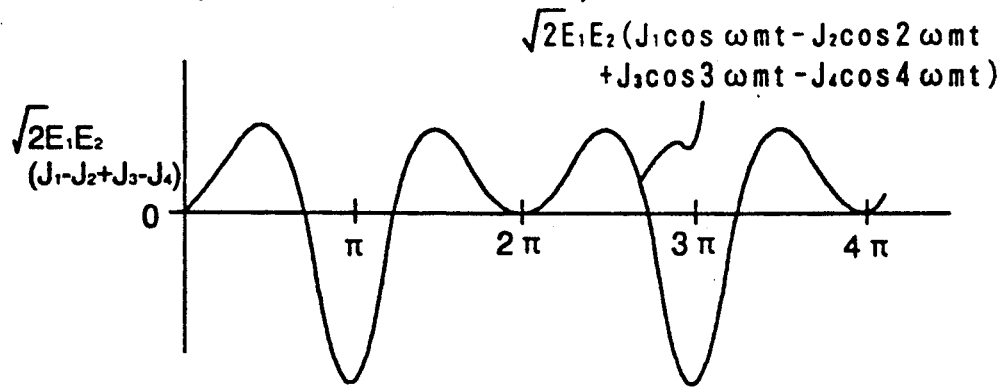
Figure 5H:
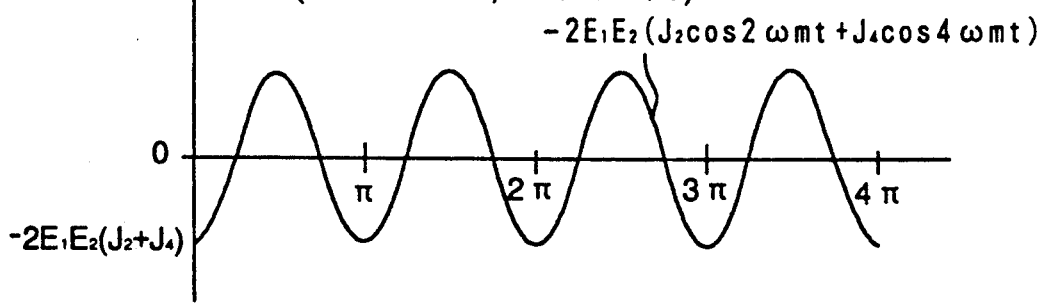
Figure 5I:
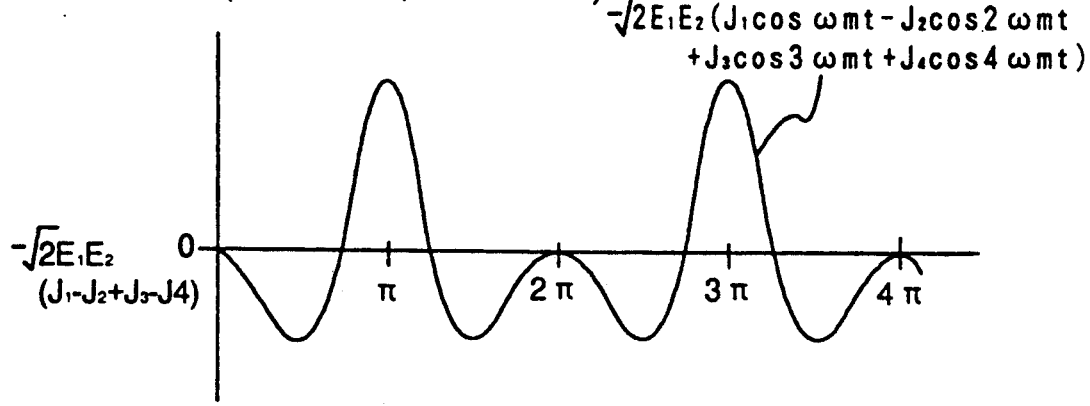

The sampling pulse signal is obtained by dividing the reference signal having frequency fr output from the reference signal generator 12a of the signal generating unit 12 into frequency fs by means of the frequency divider 12b. As shown in FIG. 2, the reference signal is divided for frequency fs=8/3·fm so that sampling timing for one cycle of the basic modulation frequency fm of the output signal of the optical system 1 is repeated in a time-staggered way over three cycles.

In order to sample up to the fourth higher harmonic component, sampling pulses of at least 8 fm (2×4 fm) are required according to Shannon's sampling theorem. However, an equivalent time sampling method is used here to obtain the number of sampling necessary for one cycle from three cycles, on the condition that the output signal of the optical system 1 is substantially constant over three cycles. This enables use of a relatively inexpensive, low speed and high precision analog-to-digital converter.

The digital signal processing unit 10 includes a processor 101 for carrying out high-speed Fourier transformation of the sampling data received from the analog-to-digital conversion unit 9, and a discriminator 102 for determining whether real numbers in the results of operation received from the processor 101 are positive or negative. The discriminator 102 includes a memory 102a for storing reference data for discrimination, and a comparator 102b for comparing the results of operation with the reference data.

A processing sequence of the signal processing section for determining a direction of rotation applied to the fiber optic gyroscope will be described next with reference to the flowchart shown in FIG. 3.

First, step #1 is executed to sample the output signal received from the signal generating section A through the analog-to-digital conversion unit 9. Then, at step #2, sampling data thereby obtained are subjected to the high-speed Fourier transformation at the processor 101.

At step #3, results of operation for the basic modulation frequency S1 are extracted from results of the operation carried out at step #2. At step #4, the results of operation extracted are substituted into a reference discriminant stored in the memory 102a.

The reference discriminant is obtained in the following way:

The signal generating section A and processing section 8 are set to a turntable as reference systems, and the turntable is spun at an equal speed clockwise and counterclockwise.

Data are sampled during the spins in the two directions. These data are subjected to the high-speed Fourier transformation at the processor 101, to extract results of operation P and Q for the basic modulation frequency S1.

As shown in FIG. 4, a real number and an imaginary number in the two resulting complex numbers P and Q are set to an X-Y coordinates, and an equation [7] representing a vertical bisector: L between the two points, as follows:

$$y = f(x) \qquad [7]$$

The equation [7] representing the vertical bisector is stored in the memory 102a as the reference discriminant.

Thus, at step #4, the results of operation for the basic modulation frequency S1 are substituted into the equation [7] with the real number and imaginary number set to the X-Y coordinates.

Step #5 is then carried out to determine the direction of spin, i.e. forward or clockwise if y is positive and backward or counterclockwise if y is negative.

In FIG. 4, points A through D are plots of the results of operation in an actual measurement system. These points represent the following angular velocities of rotation:

Point A . . . 0.5°/sec.
Point B . . . 5.0°/sec.
Point C . . . −0.5°/sec.
Point D . . . −5.0°/sec.

Next, at step #8, an angular velocity of rotation is obtained by calculating $\Delta\theta$ shown in equation [5] from the results of operation for the basic modulation frequency S1 and results of operation for the second higher harmonic component S2 in equation [4].

Further, at step #9, feedback and other controls are effected for the phase modulator 6 based on equation [6].

A further embodiment will be described hereinafter.

Basically, this embodiment differs from the preceding embodiment in the manner in which the signal is processed by the digital signal processing unit 10. Description will not be repeated for overlapping portions of the digital signal processing in the two embodiments.

The processor 101, memory 102a and comparator 102b digital signal processing unit 10 have different functions than in the preceding embodiment. The memory 102a stores a basic waveform data obtained when a predetermined angular velocity is applied to the fiber optic gyroscope. The comparator 102a compares the basic waveform data and a waveform data occurring a predetermined time after the output signal of the timing signal generating unit 12 among the sampling data provided by the analog-to-digital conversion unit 9, and determines the direction of rotation from the result of comparison. The processor 101 calculates the angular velocity of rotation.

Assume that the fiber optic gyroscope has a scale factor, i.e. $(8\pi NA/\lambda c)$ in equation [1], designed to be 0.5, and a dynamic range to be 0 to $\pm 360°/S$. Then, in a low precision gyroscope in which the fifth and higher harmonic components of the signal output from the signal generating section A may be disregarded, add waveforms from basic modulation frequency S1 to fourth higher harmonic component S4 shown in equation [4]

$$\begin{aligned}F(\omega t) = &\ 2E1E2J1(2b\sin(\phi/2))\sin\Delta\theta\cos\omega t\ + \\ &\ 2E1E2J2(2b\sin(\phi/2))\cos\Delta\theta\cos2\omega t\ + \\ &\ 2E1E2J3(2b\sin(\phi/2))\sin\Delta\theta\cos3\omega t\ + \\ &\ 2E1E2J4(2b\sin(\phi/2))\cos\Delta\theta\cos4\omega t\end{aligned}$$

vary with the angular velocity applied and the direction of rotation, as shown in FIGS. 5A through 5I. FIG. 6 shows amplitude values and polarities at points P1, P2, P3 and P4 arranged at intervals of ¼f from starting point P0 of one cycle of the modulation frequency f corresponding to a predetermined time after the trigger signal.

FIG. 7 shows a table centering on the amplitude at point P0 and the amplitude polarity at point P2. The range of amplitude values A0 at point P0 and the amplitude polarity at point P2 are limited by the direction of rotation and the level of angular velocity applied.

That is, the direction of rotation is determined by checking the regions shown in FIG. 7 to which the value of polarity at point P0 and the amplitude polarity at point P2 belong.

Thus, the basic waveform data stored in the memory 102a are values corresponding to angular velocities 0°/S, 90°/S, 180°/S, −180°/S, −270°/S and 360°/S in the value of amplitude at point P0.

Figure 8:
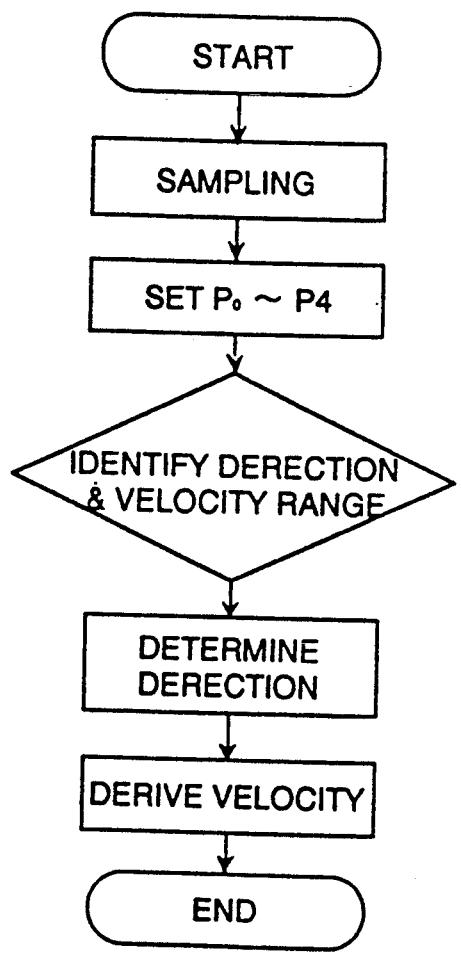
FIG. 8 is a flowchart of digital signal processing in a modified embodiment.

A processing sequence of the signal processor 10 will be described next with reference to the flowchart shown in FIG. 8.

First, step #1 is executed to sample the output signal of the signal generating section A as digitalized by the analog-to-digital conversion unit 9.

Then, step #2 is executed to set starting point P0 corresponding to a predetermined time after the trigger signal output from the timing signal generating unit 12, and points P1, P2, P3 and P4 at respective quarter cycles to follow.

At step #3, the amplitude at point P0 is compared with the waveform data stored in the memory 102a, and the range of angular velocity and direction of rotation as shown in FIG. 7 are identified by the result of comparison and the polarity of amplitude at point P2.

At step #4, an angular velocity is calculated by using the operation expression for the identified angular velocity range as shown in FIG. 7.

Different operation expressions are used for different angular velocity ranges in deriving an angular velocity at step #4 in order to obtain a value with high precision by avoiding an increase in operating error and output of an indefinite value.

The fiber optic gyroscope in this embodiment has a scale factor at 0.5 and a dynamic range at 0 to ±360°/S. However, the fiber optic gyroscope may have a scale factor and a dynamic range not limited to the above values but set to other selected values.

Figure 9A:
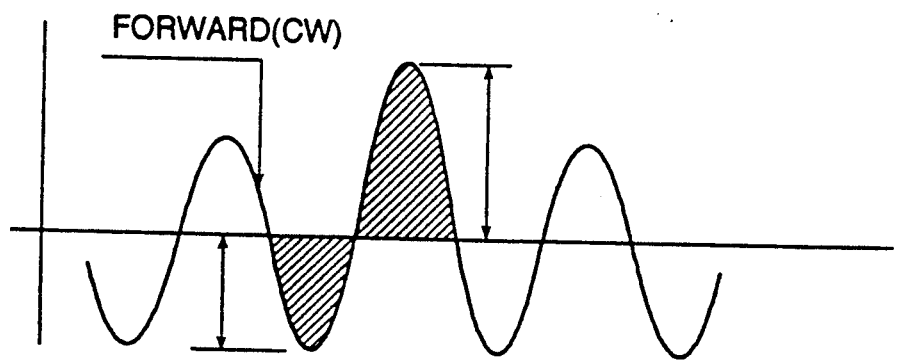
FIGS. 9A and 9B are views showing other waveforms of the outputs from the signal generating section.
Figure 9B:
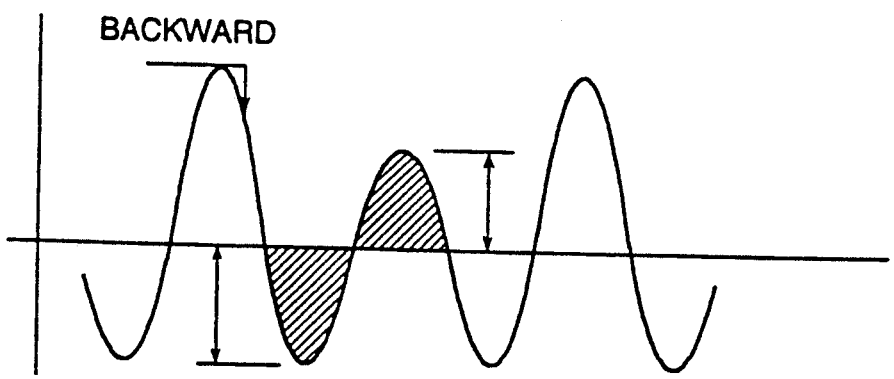

In this embodiment, the direction of rotation is determined by using values of amplitude and the like with a starting point set to a predetermined time after the timing signal. Instead, the direction may be determined by using the fact that, as shown in FIGS. 9A and 9B, the add waveforms of basic modulation frequency S1 and second higher harmonic component S2 include waveforms of the first half and second half corresponding to the modulation frequency of the phase modulator which vary with the direction of rotation.

That is, data showing a difference in waveform such as in area formed between the waveform and time axis or in maximum absolute value of amplitude is obtained with respect to the first half cycle and second half cycle from the zero cross point after the timing signal, and sizes or levels of such data are compared. For this purpose, characteristic values of waveform variations with respect to the directions of rotation are stored in the memory beforehand, and the direction of rotation is determined by comparing the above-mentioned sizes or levels with the stored data.

In this case, the rotation is judged to be forward (CW) when the data of the second half waveform is greater than the data of the first half.

Modifications of the foregoing equivalent sampling method will be listed hereinafter.

[1] In the described embodiments, the sampling pulse signal is divided from the output signal of reference signal generator 12a. Instead, the sampling pulse signal may be generated by using a phase synchronizing circuit synchronized with the synchronizing signal of the phase modulator 6.

[2] The described embodiments use an equivalent time sampling method which obtains the number of sampling necessary for one cycle from three cycles. This is not limitative. The sampling data necessary for one cycle may be obtained from any number of cycles.

Figure 10:
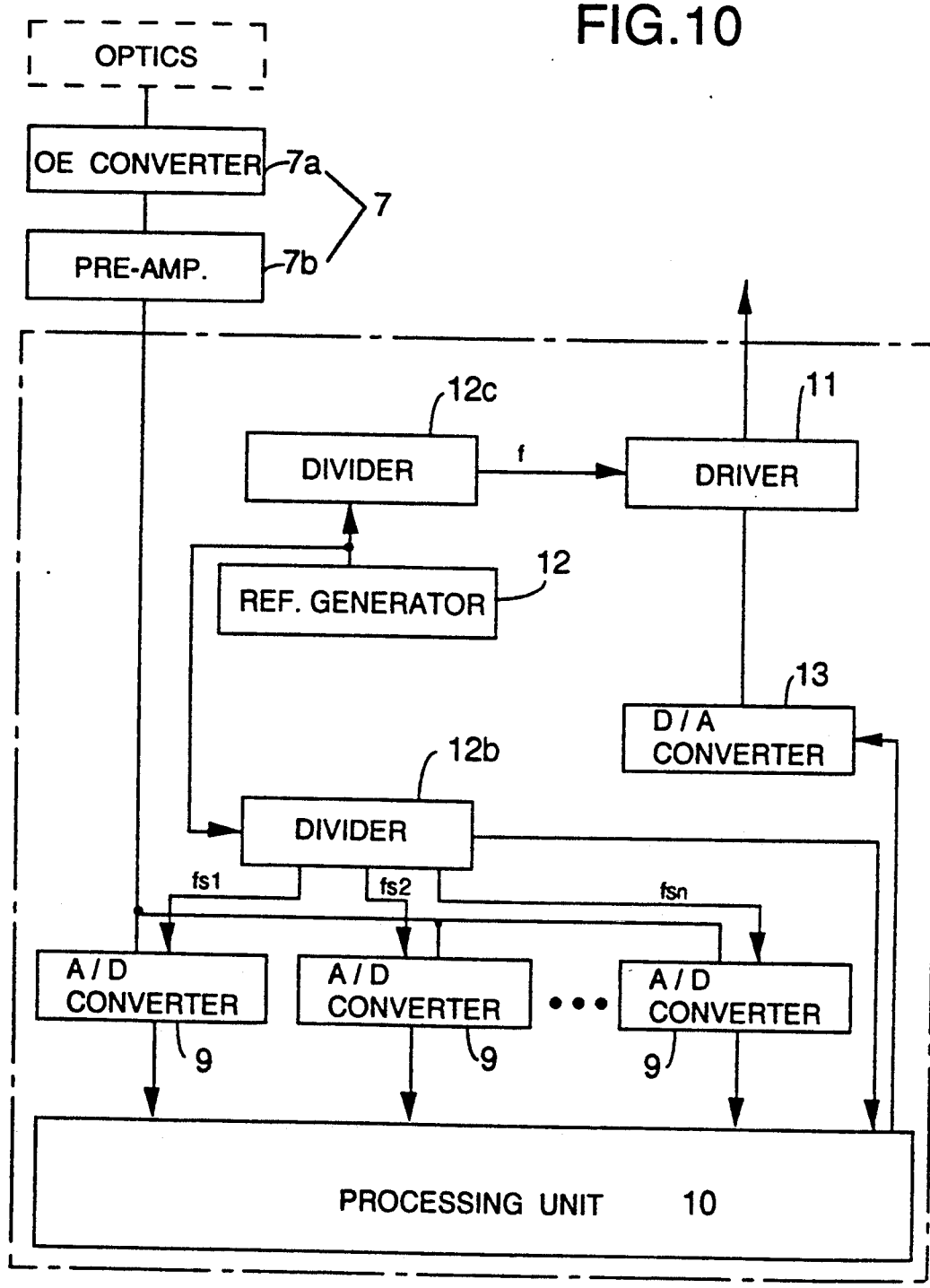
FIG. 10 is a block diagram of a gyroscope having a plurality of analog-to-digital converters.

[3] In the described embodiments, data are sampled by the single analog-to-digital conversion unit 9 by using the equivalent time sampling method. Alternatively, a plurality of analog-to-digital conversion units may be provided as shown in FIG. 10. In this case, the analog-to-digital conversion units carry out data sampling based on sampling pulses having frequencies fs1-fsn satisfying Shannon's sampling theorem (e.g. fs=8 fm in the foregoing embodiments) over one cycle of basic frequency fm and supplied to the respective analog-to-digital conversion units.

This construction has the advantage of increasing the dynamic range since all sampling is completed in one cycle by using low-cost and low-speed analog-to-digital conversion units.

[4] The equivalent time sampling method as in the foregoing embodiments may be applied to the plurality of analog-to-digital conversion units described in paragraph [3] above.

What is claimed is:

1. A phase-modulated fiber optic gyroscope comprising:
    signal generating means including a light source, an optical path for propagating light from said light source clockwise and counterclockwise, and a phase modulator for modulating the light propagating through said optical path,
    photoelectric conversion means for converting an optical signal received from said signal generating means into an electric signal, and
    signal processing means for deriving a direction of rotation and a velocity of rotation from the electric signal received from said photoelectric conversion means, said signal processing means including analog-to-digital conversion means for converting the electrical signal received from said photoelectric conversion means directly into a digital signal, and digital signal processing means for carrying out angle calculations based on the digital signal received from said analog-to-digital conversion means,
    wherein said digital signal processing means includes processing means for effecting high-speed Fourier transformation of the digital signal input thereto from said analog-to-digital conversion means, and memory means for storing positive/negative discriminating reference data corresponding to real and imaginary number portions of a Fourier transformation value, whereby the positive/negative data of the real number portion of the Fourier transformation value is determined through comparison between the Fourier transformation value received from said processing means and the positive/negative discriminating reference data for determining a direction of rotation.

2. A fiber optic gyroscope as claimed in claim 1, further comprising an equivalent time sampling pulse generator for repeatedly generating, as staggered in time over a plurality of cycles, a sampling pulse signal for simulating one cycle of the electric signal output from said photoelectric conversion means, said analog-to-digital conversion means being operable in response to the sampling pulse signal to convert an input signal with the plurality of cycles into the digital signal, and said digital signal processing means making an evaluation by recovering a signal corresponding to one cycle from said digital signal.

3. A fiber optic gyroscope as claimed in claim 1, wherein said analog-to-digital conversion means includes a plurality of analog-to-digital converters, and an equivalent time sampling pulse generator is provided for repeatedly generating, as staggered in time over a plurality of cycles, sampling pulse signals for simulating one cycle of the electric signal output from said photoelectric conversion means, said analog-to-digital converters being operable in response to the sampling pulse signals to convert an input signal with the plurality of cycles into the digital signal at points of time assigned to the respective converters, and said digital signal processing means making an evaluation of a signal corresponding to one cycle simulated from said digital signal.

4. A phase-modulated fiber optic gyroscope comprising;
    signal generating means including a light source, an optical path for propagating light from said light source clockwise and counterclockwise, and a phase modulator for modulating the light propagating through said optical path,
    photoelectric conversion means for converting an optical signal received from said signal generating means into an electric signal, and signal processing means for deriving a direction of rotation and a velocity of rotation from the electric signal received from said photoelectric conversion means, said signal processing means including analog-to-digital conversion means for converting the electric signal received from said photoelectric conversion means directly into a digital signal, and digital signal processing means for carrying out angle calculations based on the digital signal received from said analog-to-digital conversion means, wherein said digital signal processing means is operable to determine a direction of rotation by comparing waveform information included in an input digital signal and based on components of a synchronizing signal synchronized with a modulation signal of said phase modulator, with basic waveform information stored in advance.

5. A fiber optic gyroscope as claimed in claim 4 further comprising an equivalent time sampling pulse generator for repeatedly generating, as staggered in time over a plurality of cycles, a sampling pulse signal for simulating one cycle of the electric signal output from said photoelectric conversion means, said analog-to-digital conversion means being operable in response to the sampling pulse signal to convert an input signal with the plurality of cycles into the digital signal, and said digital signal processing means making an evaluation by recovering a signal corresponding to one cycle from said digital signal.

6. A fiber optic gyroscope as claimed in claim 4, wherein said analog-to-digital conversion means includes a plurality of analog-to-digital converters, and an equivalent time sampling pulse generator is provided for repeatedly generating, as staggered in time over a plurality of cycles, sampling pulse signals for simulating one cycle of the electric signal output from said photoelectric conversion means, said analog-to-digital converters being operable in response to the sampling pulse signals to convert an input signal with the plurality of cycles into the digital signal at points of time assigned to the respective converters, and said digital signal processing means making an evaluation of a signal corresponding to one cycle simulated from said digital signal.

* * * * *